US011129002B2

(12) United States Patent
Pfadler et al.

(10) Patent No.: US 11,129,002 B2
(45) Date of Patent: Sep. 21, 2021

(54) METHOD FOR SUPPORTING A FIRST MOBILE STATION TO PREDICT THE CHANNEL QUALITY FOR A PLANNED DECENTRALIZED WIRELESS COMMUNICATION TO A COMMUNICATION PARTNER STATION, MOBILE STATION, AND TRANSPORTATION VEHICLE

(71) Applicant: VOLKSWAGEN AKTIENGESELLSCHAFT, Wolfsburg (DE)

(72) Inventors: Andreas Pfadler, Berlin (DE); Daniel Reimann, Braunschweig (DE); Guillaume Jornod, Berlin (DE); Ahmad El Assaad, Wolfsburg (DE)

(73) Assignee: VOLKSWAGEN AKTIENGESELLSCHAFT

( * ) Notice: Subject to any disclaimer, the term of this patent is extended or adjusted under 35 U.S.C. 154(b) by 0 days.

(21) Appl. No.: 16/792,731

(22) Filed: Feb. 17, 2020

(65) Prior Publication Data
US 2020/0267573 A1   Aug. 20, 2020

(30) Foreign Application Priority Data

Feb. 20, 2019 (EP) ..................... 19158381

(51) Int. Cl.
*H04W 4/02* (2018.01)
*H04W 24/08* (2009.01)
(Continued)

(52) U.S. Cl.
CPC ............ *H04W 4/46* (2018.02); *H04B 7/0413* (2013.01); *H04B 7/0626* (2013.01); *H04B 7/086* (2013.01);
(Continued)

(58) Field of Classification Search
None
See application file for complete search history.

(56) References Cited

U.S. PATENT DOCUMENTS

2014/0213241 A1  7/2014 Altintas et al.
2016/0295624 A1  10/2016 Novlan et al.
(Continued)

OTHER PUBLICATIONS

Tang et al.; Mobility Prediction Progressive Routing (MP2R), a Cross-Layer Design for Inter-Vehicle Communication IEICE Trans. Commun.; Jan. 2008; vol. E91-B, No. 1.
(Continued)

*Primary Examiner* — Scott M Sciacca
(74) *Attorney, Agent, or Firm* — Barnes & Thornburg LLP

(57) ABSTRACT

A method for supporting a first mobile station to predict the channel quality for a planned decentralized wireless communication to a communication partner station which includes sending to the first mobile station from a second mobile station a report about the channel quality measured at the second mobile station. This report includes at least one information entry about the channel quality measured by the second mobile station at a position for a communication to or from a third mobile station indicated in the report. The first mobile station benefits from the historical channel quality measurements of the second transportation vehicle. The accuracy of the channel quality prediction is thus increased.

20 Claims, 4 Drawing Sheets

(51) Int. Cl.
H04W 24/10 (2009.01)
H04W 16/28 (2009.01)
H04W 64/00 (2009.01)
H04B 17/373 (2015.01)
H04W 4/46 (2018.01)
H04L 12/26 (2006.01)
H04W 28/02 (2009.01)
H04W 4/40 (2018.01)
H04B 7/0413 (2017.01)
H04B 7/06 (2006.01)
H04B 7/08 (2006.01)
H04L 1/00 (2006.01)
H04W 72/12 (2009.01)

(52) U.S. Cl.
CPC ......... *H04B 17/373* (2015.01); *H04L 1/0026* (2013.01); *H04L 43/0882* (2013.01); *H04W 4/027* (2013.01); *H04W 4/40* (2018.02); *H04W 16/28* (2013.01); *H04W 24/08* (2013.01); *H04W 24/10* (2013.01); *H04W 28/0273* (2013.01); *H04W 64/006* (2013.01); *H04W 72/1231* (2013.01)

(56) References Cited

U.S. PATENT DOCUMENTS

| | | |
|---|---|---|
| 2017/0048156 A1 | 2/2017 | Simsek |
| 2018/0109937 A1 | 4/2018 | Lee et al. |
| 2018/0184442 A1 | 6/2018 | Bai et al. |
| 2018/0206140 A1* | 7/2018 | Panteleev ........... H04W 72/044 |
| 2018/0242190 A1* | 8/2018 | Khoryaev ............ H04L 47/283 |
| 2018/0324661 A1* | 11/2018 | Ryden ................. H04B 7/0695 |
| 2020/0145867 A1* | 5/2020 | Tseng ................. H04W 76/14 |
| 2021/0006282 A1* | 1/2021 | Faerber .................. H04B 1/10 |

OTHER PUBLICATIONS

Wikipedia; Mixture Distribution; downloaded from https://en.wikipedia.org/wiki.Mixture_distribution; dowloaded earlier than Feb. 20, 2019.

* cited by examiner

METHOD FOR SUPPORTING A FIRST MOBILE STATION TO PREDICT THE CHANNEL QUALITY FOR A PLANNED DECENTRALIZED WIRELESS COMMUNICATION TO A COMMUNICATION PARTNER STATION, MOBILE STATION, AND TRANSPORTATION VEHICLE

PRIORITY CLAIM

This patent application claims priority to European Patent Application No. 19158381.4, filed 20 Feb. 2019, the disclosure of which is incorporated herein by reference in its entirety.

SUMMARY

Illustrative embodiments relate to a method for supporting a first mobile station to predict the channel quality for a planned decentralized wireless communication to a communication partner station, mobile station, and transportation vehicle. Illustrative embodiments also relate to a corresponding mobile station, and a transportation vehicle.

BRIEF DESCRIPTION OF THE DRAWINGS

Exemplary embodiments are shown in the drawing and are explained in greater detail in the following description. In the drawings.

DETAILED DESCRIPTION

Figure 1:
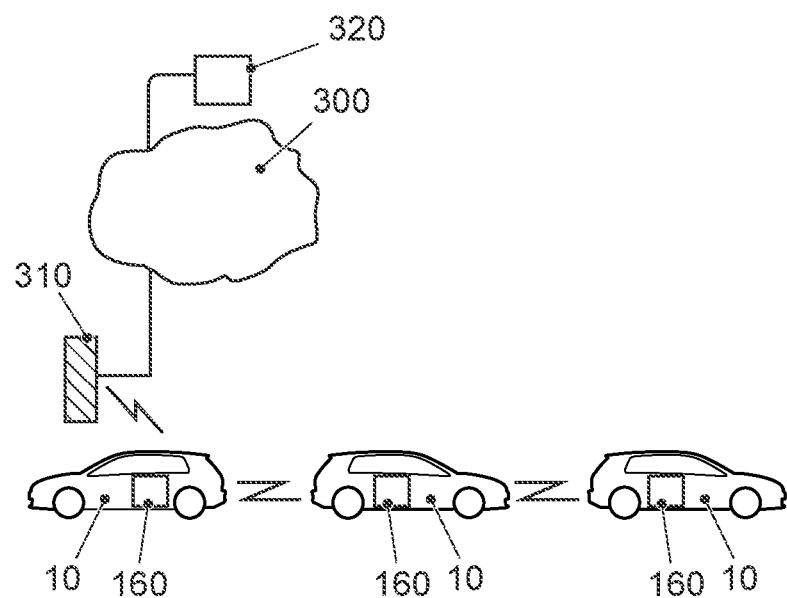
FIG. 1 illustrates the principle architecture of a decentralized V2V and V2X communication system.

For the scenario of transportation vehicles equipped with wireless communication modules that provide connectivity to public communication networks but also provide a direct communication capability for exchanging information among the road participants, wireless communication offers the opportunity to implement a wide range of applications. A lot of research concerns the fields of cooperative and autonomous driving. Direct communication between transportation vehicles is often referred to be Vehicle-to-Vehicle communication (V2V). Also possible is communication from and to a transportation vehicle with infrastructure communication stations such as a Road Side Unit (RSU). Such type of communication is very often referred to be Vehicle-to-everything communication (V2X). When V2X communication is supported with cellular communication methods or mechanisms, like LTE or 5G mobile communication it is referred to be cellular-V2X (C-V2X) communication.

Predictive Quality of Service (PQoS) for radio communication estimates and predicts the radio channel, i.e., the channel coefficients. Therefore, a transportation vehicle measures its radio channel (link) for a specific geographical location. The information of the measured radio link is shared with other users to predict their communication quality for this geographical location in the future.

Typical communication scenarios for V2V communication are road safety scenarios, traffic efficiency scenarios and infotainment scenarios. From the road safety scenarios the following examples are currently being deployed: "Cooperative Forward Collision Warning", "Pre-Crash-Detection/Warning", "Lane change warning/blind spot warning", "Emergency Electric Brake Light Warning", "Intersection Movement Assist", "Emergency Vehicle Approaching", "Road Works Warning" (non-exhaustive list). From the traffic efficiency scenarios the "High-Density Platooning" is mentioned. The high density platooning application could also be regarded to be an example of the road safety scenarios, because the cooperative driving of a plurality of transportation vehicles in a convoy with small distance (<10 m) is very critical in terms of the safety requirements.

For the V2V or V2X communication the following technologies are available. LTE-based and 5G-based C-V2X with sidelink communication at the physical layer, also called PC5 sidelink communication, and WLAN p communication (IEEE 802.11p).

Automated driving is on the rise. Though it has been demonstrated that automated transportation vehicles can rely on their own sensors for environmental scanning, it is foreseen that they can greatly benefit from cooperation with surrounding transportation vehicles, either in terms of control or in terms of perception. This cooperation is supported by V2V or in general V2X communication.

The number of transportation vehicles using V2X communication is increasing instantaneously. Not only the number of users is increasing but also the amount of information is considerably high. Examples for V2X messages are Cooperative Awareness Message (CAM), Decentralized Environmental Notification Messages (DENM), Collective Perception Message (CPM) and Basic Safety Message (BSM). Furthermore, infrastructure stations are communicating over the same channel for, e.g., traffic lights are transmitting Signal Phase and Timing (SPaT) and MAP messages. Many users are occupying the radio channel.

From US 2017/0048156 A1 a method for estimating the probability that a data packet, wirelessly transmitted from a transmitter, which is a traffic infrastructure object or a transportation vehicle to a receiver will be received. The method includes estimating a signal quality of the data packet and estimating the probability that the data packet will be received on the basis of the estimated signal quality.

From US 2014/0213241 A1 a wireless communication device and wireless communication method is known. The wireless communication device includes a learning database that stores, in association with each other, a surrounding situation of a first wireless communication device, a predetermined communication parameter, and a communication performance in communication in a case where the communication is performed between the first communication device and a second communication device by using the predetermined communication parameter. A surrounding situation determination methods or mechanisms for determining a surrounding situation of a host device is provided and determines the surrounding situation from the information obtained from the plurality of sensors. Communication parameter determination methods or mechanisms are also provided for referring to the learning database to determine candidates of a communication parameter that is appropriate in the surrounding situation of the host device. Finally, the wireless communication methods or mechanisms are adapted for performing communication by using the communication parameter determined by the communication parameter determination methods or mechanisms. Herein, as the communication performance, any index can be adopted as long as the index indicates the performance of the communication. As examples of the communication performance, there can be adopted throughput, Round Trip Time (RTT), Signal to Noise Ratio (SNR), Bit Error Rate (BER), and packet error rate (PER).

From US 2018/184442 A1 a communication apparatus and method for inter-vehicular communication, and more particularly, to a communication apparatus and method for a safety driving service using an inter-vehicular communication technology is known. Main purpose is an effort to provide a communication apparatus and method capable of performing congestion control, which may satisfy requirements of an application service while avoiding a network congestion situation in inter-vehicular communication. This is performed with a network state estimating unit which estimates network state information indicating a current network state based on driving information and channel state information about the neighboring transportation vehicles recognized through the messages received from the neighboring transportation vehicles.

From the article "Mobility Prediction Progressive Routing (MP2R), a Cross-Layer Design for Inter-Vehicle Communication" S. Tang, N. Kadowaki and S. Obana in IEICE Trans. Commun. Vol. E91-B. No. 1. January 2008 a solution based on beam steering is known with which the inter-vehicle communication could be improved.

For decentralized communication standards as for, e.g., IEEE 802.11p or LTE-V mode 4, no Quality of Service (QoS) is provided. Reasons are permanent mobility and hence instantaneously changing communication conditions. The channel access is based on Carrier Sense Multiple Access with Collision Avoidance (CSMA/CA) and sensing-based Semi-Persistent Scheduling (SPS) for IEEE 802.11p and LTE-V mode 4, respectively. For CSMA/CA the user first senses the channel until it is idle, then it waits for a certain time (back off time), if the channel is still idle it transmits. The waiting time until the channel is idle depends on the number of users and these conditions are changing frequently in the use case of transportation vehicle communication. However, channel load is a very critical parameter. Sensing-based SPS for LTE-V mode is specified in Release 14. Here the user reserves selected resources for a random number of consecutive packets.

In the case of CSMA/CA the probability for channel access decreases with the number of users. In some cases such as safety-critical applications supported by V2X communication, it is essential to get a reliable communication or at least to be able to predict the expected quality of service in the future.

Disclosed embodiments improve the accuracy of channel prediction to optimize the reliability of V2V and V2X communication.

Disclosed embodiments provide a method for transmitting from a second mobile station to a first mobile station an information entry about the channel quality measured by the second mobile station, a corresponding mobile station, and a transportation vehicle.

In the proposed solution, transportation vehicles are sharing the channel quality that they experienced (i.e., measured received power) along with geographical position and time stamp corresponding to the measurement. With this information other transportation vehicles are able to predict their channel access probability or just their expected communication quality in the future.

The idea is to share its own experienced channel quality with other users in a decentralized wireless communication process. This means that a transportation vehicle needs to measure the quality of the channel. Therefore, it is proposed to measure the received power, which can be seen as interference, the geographical position and optionally a corresponding time stamp. To aggregate the studied metric and to avoid to overload the channel with raw data, it is proposed to share the statistical distribution of the received power corresponding to a certain section or area.

A disclosed embodiment relates to a method for transmitting from a second mobile station to a first mobile station an information entry about the channel quality measured by the second mobile station, comprising sending to the first mobile station from a second mobile station a report about the channel quality measured at the second mobile station, the report comprising at least one information entry about the channel quality measured by the second mobile station at a position indicated in the report, wherein the at least one information entry comprises a description of a statistical distribution of channel quality measurement values taken at different places of the second mobile station while the second mobile station was moving along a section of a travelling path, wherein the at least one information entry comprises a description of a statistical distribution of channel quality measurement values taken at different places of the second mobile station while the second mobile station was moving along a section of a travelling path. This proposal allows to predict channel properties in a succeeding mobile station for a future communication with the partner station with greater accuracy such that the future communication is becoming more reliable.

The proposal is very beneficial for the application to V2V and V2X communication in a decentralized wireless communication process, wherein the first mobile station and second mobile station correspond to transportation vehicles equipped with a communication module moving on a road, place or ground.

Typically, the distribution is a statistical distribution of historical channel quality measurements. This way it is possible to avoid transferring all the measurement samples to the first mobile station.

Here, it is beneficial that the description of a distribution comprises the distribution type, and one or more characteristics of the statistical distribution. Typical characteristics comprise the mean value and variance of the distribution.

In an exemplary embodiment it is beneficial if the report further comprises at least one information entry for the position of the section of the travelling path the second mobile station was moving on while it was taking measurement values for the channel quality. If, for example, the center position or the beginning or the end position is reported, the first mobile station can easily determine if this report is interesting for itself by checking its own navigation route.

The report may be further extended with at least one information entry about the time the second mobile station was moving on the section of the travelling path while it was taking measurement values for the channel quality. With this information the first transportation vehicle can easily check the up-to-datedness of the report.

It is also beneficial if the at least one information entry about the position of the section of the travelling path the second mobile station was moving on while it was taking measurement values for the channel quality comprises a position information in a curvilinear coordinate system the mobile stations are moving in. Particularly the WGS84 coordinate system is used for such purposes.

In another disclosed embodiment the report further comprises at least one information entry about the movement of the second mobile station, such as movement direction and speed of the movement. This helps to improve the accuracy of the channel quality prediction. The first mobile station can check if it plans to communicate under similar movement constraints. This may be important for estimating the Doppler spread.

For sending the report to the first mobile station, it is beneficial to define a certain format of a shared channel quality message with a corresponding header such that the message can be quickly processed for recording in a dedicated memory section and evaluating the payload.

The channel quality measurement may beneficially comprise the measurement of the received power of the signal received during the communication to or from a third mobile station and optionally an error rate determined for the communication to or from the third mobile station. This error rate may be the bit error rate (BER).

For implementing the proposal it is beneficial to adapt a mobile station with a wireless communication module for transmitting messages to a third mobile station, wherein the wireless communication module is adapted to transmit a channel quality report to a first mobile station in a shared channel quality message, the report comprising at least one information entry about the channel quality measured by the mobile station at a position indicated in the channel quality report, wherein the at least one information entry comprises a description of a statistical distribution of channel quality measurement values taken at different places of the second mobile station while the second mobile station was moving along a section of a travelling path.

Such wireless communication module may be further adapted to receive a shared channel quality message, from a second mobile station, and by further comprising a procession unit, the processing unit being adapted for predicting a channel quality for the communication between the first mobile station and a partner station based on the channel quality report received in the shared channel quality reporting message. With this adaptation the same mobile station may play the role of the second mobile station as well as the role of the first mobile station.

Likewise, it is beneficial to adapt the wireless communication module for transmitting a message to the partner station with a transmission characteristics setting corresponding to the channel quality measurement for the communication between the first mobile station and the partner station.

In at least one disclosed embodiment the wireless communication module is adapted for communicating messages according to the WLAN p communication system, corresponding to the IEEE 802.11p standard. This is one important communication standard used for V2V and V2X communication. In further disclosed embodiments any other decentralized communication system, e.g., LTE-V mode 4 may be used instead of WLAN p.

For safety critical cooperative or autonomous driving applications, it is beneficial to equip a transportation vehicle with such kind of apparatus of a mobile station.

It will be appreciated by those skilled in the art that the diagrams presented herein represent conceptual views of illustrative circuitry embodying the principles of the disclosure.

The functions of the various elements shown in the figures may be provided by the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, Digital Signal Processor (DSP) hardware, Read Only Memory (ROM) for storing software, Random Access Memory (RAM), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means method or mechanism for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited methods or mechanisms are combined and brought together in the manner which the claims call for.

FIG. 1 shows the system architecture for the proposal. Reference number 10 denotes a mobile station as a transportation vehicle. The depicted mobile station is exemplified as a passenger car. In other examples it may be differently exemplified, e.g., a smart phone, a smart watch, a tablet computer, notebook or laptop computer or the like. The mobile station exemplified as a transportation vehicle may be any type of a transportation vehicle. Examples of other types of transportation vehicles are: busses, motorcycles, commercial vehicles, in particular, trucks, agricultural machinery, construction machinery, rail vehicles, etc. The use of the disclosed embodiments would be generally in land vehicles, rail vehicles, watercrafts and aircrafts possible, in particular, drones, helicopters and air taxis.

The transportation vehicle 10 is equipped with an on-board communication module 160 including corresponding antenna such that the transportation vehicle 10 can participate in a form of a decentralized wireless communication service. The expression decentralized indicates that the communication is the so-called ad hoc communication where the medium access control is done with a protocol in which stations listen for a carrier before transmitting themselves. Such kind of protocols are called carrier sense protocols. Examples are the Carrier Sense Multiple Access Collision Detection (CSMA/CD) protocols and the Carrier Sense Multiple Access Collision Avoidance (CSMA/CA) protocols. Very well-known examples of such protocols are the wireless LAN protocols according to the IEEE 802.11 standard family. The example depicted in FIG. 1 corresponds to the IEEE 802.11p standard which is adapted to be used for V2X communication. Three cars 10 are listed which communicate to each other via V2V communication according to the WLAN p communication system. The illustration also shows that one car 10 is communicating with a RSU 310 also according to WLAN p communication. The RSU 310 is positioned close to a main road on which the transportation vehicles 10 are driving. The RSU 310 typically is connected to the Internet 300. This way the cars 10 may send data to or receive data from a backend server 320, which is also connected to the Internet. In the field of cooperative and autonomous driving the backend server 320 may be located in a traffic control center. For the ease of implementation, it is considered that all components have assigned an Internet address, typically as an IPv6 address, such that the packets transporting messages between the components can be routed, correspondingly.

Figure 2:
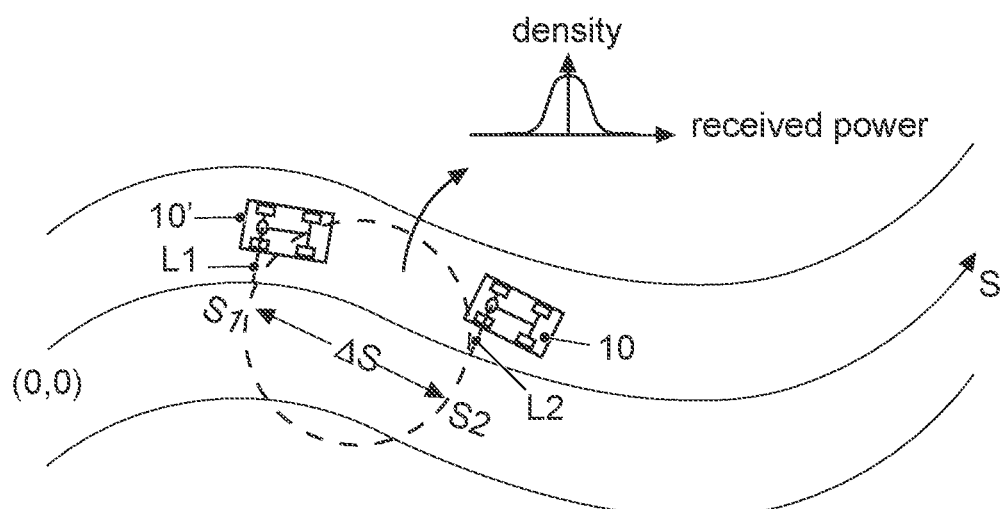
FIG. 2 shows a typical traffic scenario in which a plurality of transportation vehicles drive on a motorway and illustrates the definition of curvilinear coordinates for the movement of transportation vehicles along the motorway.

FIG. 2 shows two cars driving on a motorway with two lanes in one direction. Depicted is only the right side of the motorway, where the cars are moving from left to right. Normally, there is a typical distance between the transportation vehicles moving one after the other. Since the cars 10, 10' are moving in one direction, it is easy to understand that car 10' will get to positions where the leading car 10 was placed before. The transportation vehicle 10' when communicating with a succeeding car (not shown) in similar distance, therefore will experience very similar transmission conditions as transportation vehicle 10 when it was communicating with car 10' at the position in the illustration of FIG. 2.

It is therefore an idea of the disclosed embodiments that transportation vehicle 10' when placed at a position, the transportation vehicle 10 was located before, where it did the channel quality determination could base the channel quality prediction on the results of channel quality determination from transportation vehicle 10', thereby subjectively enhancing the channel quality prediction accuracy. What is required however, is the exchange of position information when sending a measurement report for the channel quality. Here, it is beneficial to provide the position information in the reporting message as curvilinear coordinates. This is beneficial when the road is comprising a lot of curves such that the travelling path is not following a straight line. The curvilinear coordinates are illustrated in FIG. 2. In two dimensions they comprise the values for a travelled distance S from a reference position (0,0) related to the center line of the road and the displacement (L) to the center line of the road. In FIG. 2, the position of car 10' in the curvilinear coordinate system corresponds to the coordinates (S1, L1) and the position of car 10 in the curvilinear coordinate system corresponds to the (S2, L2). The difference in terms of travelled distance between the two positions corresponds to $\Delta S=S2-S1$. Car 10, while it is travelling the distance $\Delta S$, is measuring the channel quality a plurality of times. All these measurement values will be recorded and statistically evaluated. An example for a curvilinear coordinate system which may be used is the World Geodetic Coordinate System of 1984 (WGS84) system. The details for these operations will be explained hereinafter. A distribution of such channel quality measurement values is also shown in FIG. 2.

Figure 3:
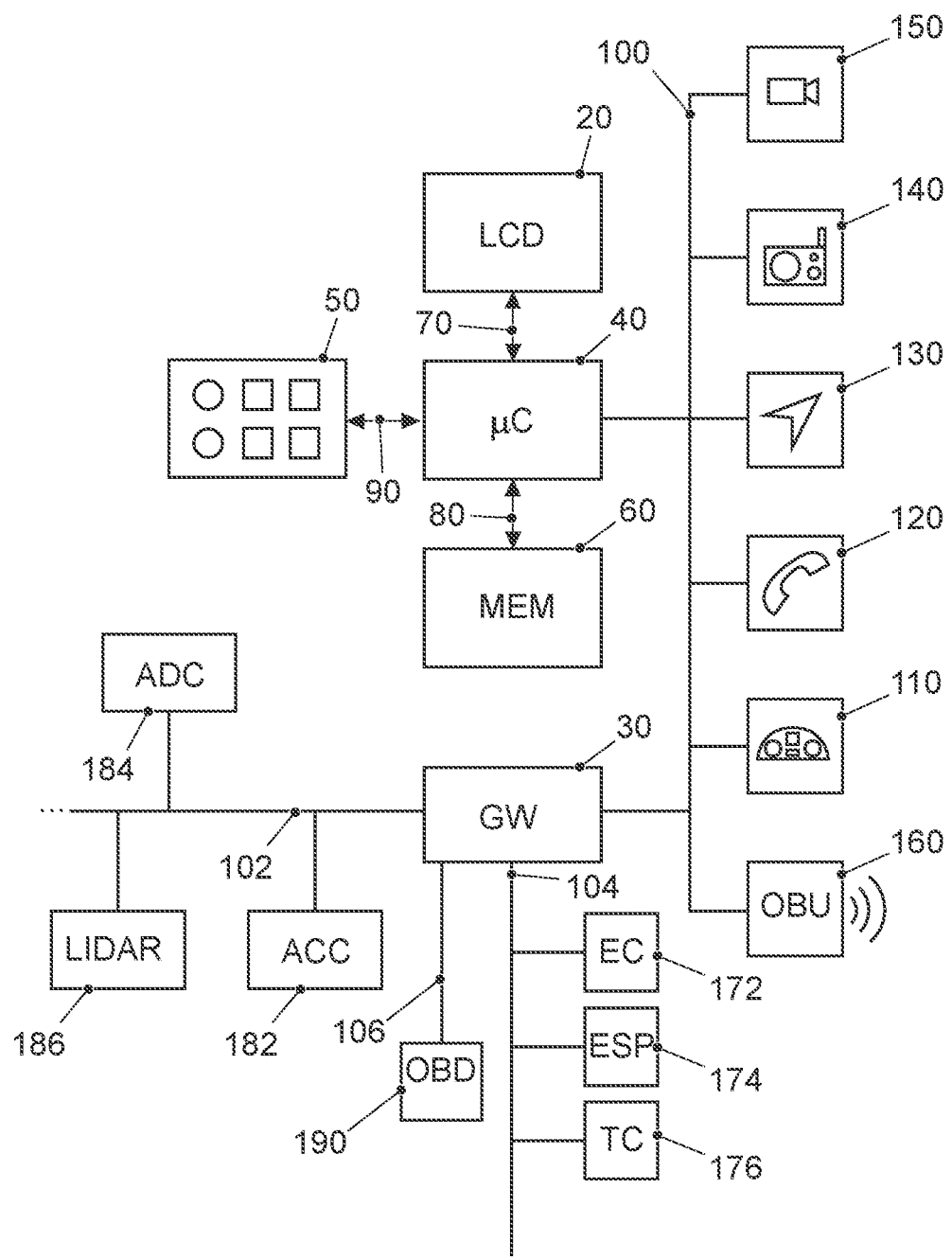
FIG. 3 shows a block diagram of a transportation vehicle's electronics system.

FIG. 3 shows schematically a block diagram of the transportation vehicle's board electronics system. Part of the board electronics system is an infotainment system which comprises: the touch-sensitive display unit 20, a computing device 40, an input unit 50, and a memory 60. The display unit 20 includes both a display area for displaying variable graphical information and an operator interface (touch-sensitive layer) arranged above the display area for inputting commands by a user.

The memory device 60 is connected to the computing device 40 via a further data line 80. In the memory 60, a pictogram directory and/or symbol directory is deposited with the pictograms and/or symbols for possible overlays of additional information.

The other parts of the infotainment system such as camera 150, radio 140, navigation device 130, telephone 120 and instrument cluster 110 are connected via the data bus 100 with the computing device 40. As data bus 100 the high-speed option of the CAN bus according to ISO standard 11898-2 may be taken into consideration. Alternatively, for example, the use of an Ethernet-based bus system such as IEEE 802.03cg is another example. Bus systems in which the data transmission via optical fibers happens are also usable. Examples are the Media Oriented System Transport (MOST) Bus or the Domestic Digital Bus (D2B) Bus. For inbound and outbound wireless communication, the transportation vehicle 10 is equipped with the communication module 160 as already mentioned.

Reference numeral 172 denotes an engine control unit. The reference numeral 174 corresponds to an ESC control unit corresponding to electronic stability control and the reference numeral 176 denotes a transmission control unit. The networking of such control units, all of which are allocated to the category of the drive train, typically occurs with the Controller Area Network(CAN) Bus 104. Since various sensors are installed in the transportation vehicle and these are no longer only connected to individual control units, such sensor data are also distributed via the bus system 104 to the individual control devices.

However, the modern transportation vehicle can also have further components such as further surroundings scanning sensors like a LIght Detection And Ranging (LIDAR) sensor 186 or RAdio Detection And Ranging (RADAR) sensor and more video cameras, e.g., as a front camera, rear camera or side camera. Such sensors are used more and more in transportation vehicles for surroundings observation. Further control devices, such as an Automatic Driving Control (ADC) unit 184 and an Adaptive Cruise Control (ACC) unit 182, etc., may be provided in the transportation vehicle. There may be other systems in the transportation vehicle, too such as the Ultra-Wide Band (UWB) transceivers for inter transportation vehicle distance measurement. The UWB transceivers may typically be used for a short distance observation, e.g., 3 to 10 m. The RADAR and LIDAR sensors could be used for scanning a range up to 250 m or 150 m and the cameras cover a range from 30 to 120 m. The components 182 to 186 are connected to another communication bus 102. The Ethernet-Bus may be a choice for this communication bus 102 due to its higher bandwidth for data transport. One Ethernet-Bus adapted to the special needs of car communication is standardized in the IEEE 802.1Q specification. Moreover, further information for surroundings observation may be received via V2V communication from other road participants. For those road participants not being in Line Of Sight (LOS) to the observing transportation vehicle it is very beneficial to receive the information about their position and motion via V2V communication. Reference number 190 denotes an on-board diagnosis interface.

For the purpose of transmitting the transportation vehicle-relevant sensor data via the communication module 160 to another transportation vehicle or to a central computer 320, the gateway 30 is provided. This is connected to the different bus systems 100, 102, 104 and 106. The gateway 30 is adapted to convert the data it receives via the one bus the transmission format of the other bus so that it can be distributed in the packets specified there. For the forwarding of this data to the outside, i.e., to another transportation vehicle or to central computer 320, the on-board communication unit 160 is equipped with the communication interface to receive these data packets and, in turn, to convert them into the transmission format of the correspondingly used mobile radio standard. The gateway 30 takes all the necessary format conversions if data are to be exchanged between the different bus systems if required.

The transmission conditions are typically represented by channel coefficients which characterize the transfer function. Since the estimated channel coefficients are dependent on many parameters, such as position and velocity of the transportation vehicle, sampling rate, used bandwidth, modulation type, etc. it is a high expenditure estimation process. The channel quality however needs to be predicted since V2X communication is a highly dynamic process already due to the fact that the distance to the communication partner station and the environment is changing all the time when the transportation vehicles are moving. On a road, there are other road participants (vehicles in different categories), traffic signs, traffic lights, buildings at the side of the road, etc. which may have influence on the channel quality which makes the task of channel quality prediction very demanding.

It is therefore an idea according to the proposal to share its own experienced channel quality with other road participants. This means that a transportation vehicle needs to measure the quality of the channel. The most important facet is the received power, therefore, it is proposed to measure the received power on the channel the car 10 wants to access when it is not transmitting, which thus can be seen as an interference level. The geographical position when the measurement has been taken for each sample will also be recorded and optionally also a corresponding time stamp. To aggregate the studied metric and to avoid to overload the channel with raw data, it is proposed for an exemplary embodiment to share the statistical distribution characteristics of the measured received power values for a corresponding to travelling distance. This way it is not necessary to distribute the raw sample values to the surrounding transportation vehicles.

In summary, the following parameters will be measured and recorded while car 10 is travelling the distance $\Delta S$:

Received power (interference)

Geographical position (longitude and latitude in WGS84 coordinate system)

Time stamp

The measurements of the received power will be performed in on-board communication module 160. The geographical position information and the time stamps will be determined by the navigation system 130. All sample values may be recorded in memory 60 or in an internal memory of the on-board communication module 160.

Figure 4:
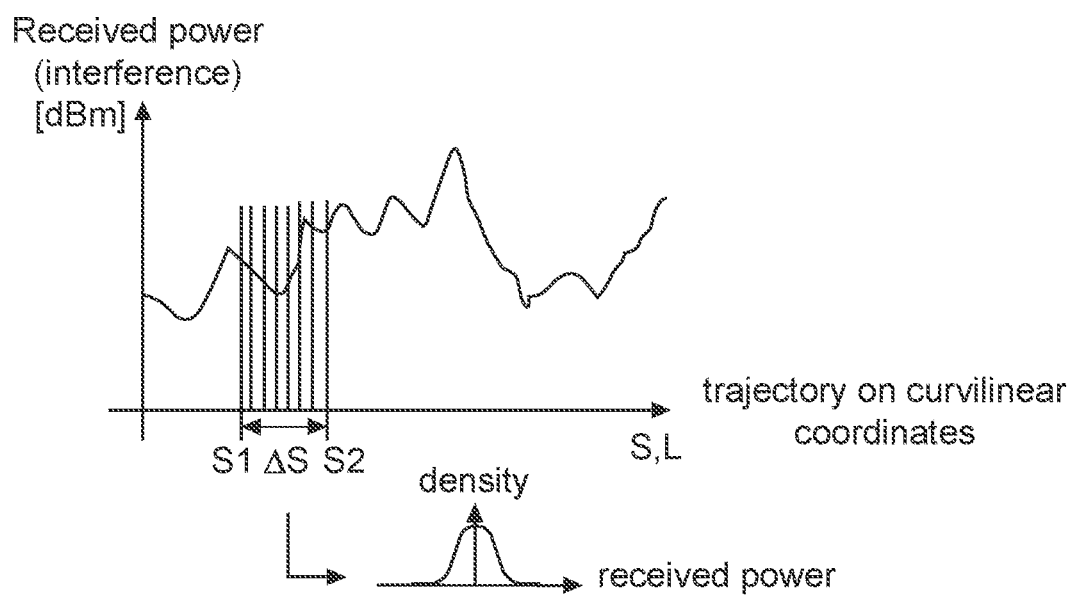
FIG. 4 shows the principle of building a metric for the received power by measuring a plurality of power values along a certain travelled distance and determining characteristics of the distribution of the measured values.

As explained above, it is more efficient to obtain characteristics of the measured distributions rather than distributing raw measurement values. To do that, a metric needs to be defined. As metric it is proposed in at least one disclosed embodiment to obtain the distribution of the received power along a certain longitudinal travelled distance $\Delta S$. FIG. 4 shows some samples of the measured received power values when the car 10 is moving along the distance $\Delta S$ shown in FIG. 2 from S1 to S2 and the obtained statistical distribution of the received power samples. This sampling depends on the time, location and speed of the moving car 10. If the car is not driving, i.e., v=0 m/s, then the sampling needs to include measurements for certain time intervals (depending on time) which needs to be considered for the distribution of the part of the trajectory $\Delta S$. FIG. 4 shows that for the depicted $\Delta S$ a certain amount of samples is obtained and is translated into a corresponding statistical distribution.

The following table depicts an example where the received power is measured when the car travels a distance $\Delta S$ with no constant speed. There are different measuring sessions under the assumption that $\Delta S=5$ m, and the time duration for travelling this distance $\Delta S$ equals 9 s.

| Session No. | Time  | Speed    | Location S |
|-------------|-------|----------|------------|
| 1           | 0-4 s | 0.5 m/s  | 0-2 m      |
| 2           | 4-6 s | 0.0 m/s  | 2.0 m      |
| 3           | 6-8 s | 0.5 m/s  | 2-3 m      |
| 4           | 8-9 s | 2.0 m/s  | 3-5 m      |

In at least one disclosed embodiment it is proposed to predefine the amount of time for recording measurement samples. If the time period is fixed, for low speed many samples are measured for travelling a small distance $\Delta S$, whereas for higher speeds the same amount of samples will be measured when the car travels a longer distance. In an exemplary embodiment it is, however, always necessary to consider the total number of samples and the time of recording to verify the credibility of the distributions.

Figure 5:
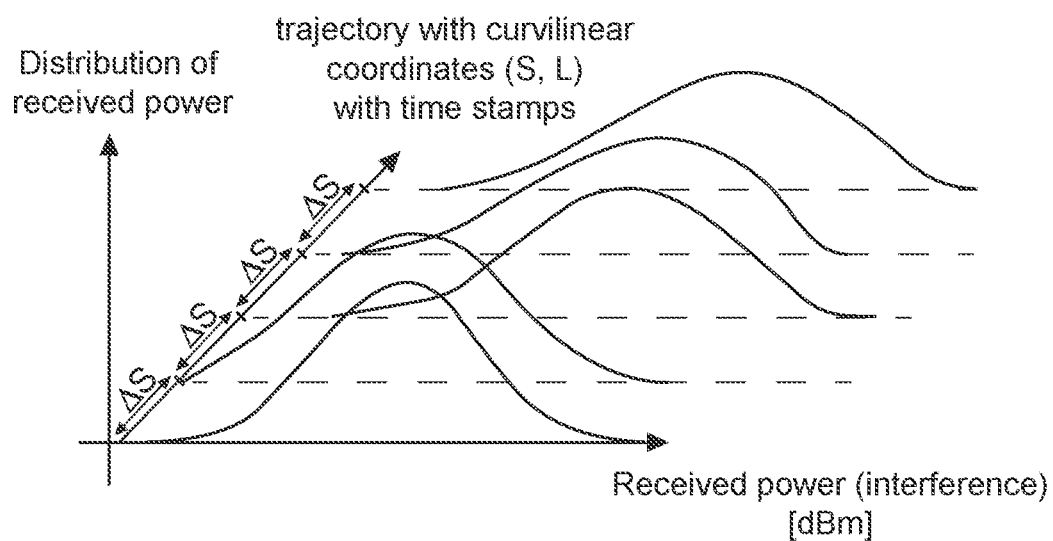
FIG. 5 illustrates a plurality of measured distributions of the received power values while a transportation vehicle is moving along a certain travelled distance.

FIG. 5 shows the calculated distributions of the received power values for different parts of the trajectory the car 10 is travelling. As seen in FIG. 5, the distributions my vary in position, shape and widths for the different road sections $\Delta S$. Mathematically, the distributions may be of different types such as "Gaussian", "Poisson", "Gamma", "Exponential", "Binomial"; "Cauchy", "Rayleigh", "Chi-quadratic" or the like.

To not overload the V2X channel with measurement raw data, particularly if more sample values are concerned, a mapping of the measured distribution to a corresponding known analytical distribution type is proposed such that only the distribution type and some parameters need to be communicated. This allows for a subjective reduction of the size of data sent that needs to be communicated in a shared channel quality message (SCQM).

The following format is proposed for the message SCQM:

| SCQMH | DISTRD | MEASD | TS | POSE | CRC |
|-------|--------|-------|----|----|-----| where

SCQMH corresponds to the message header of the SCQM message,

DISTRD corresponds to the distribution details, such as distribution type and characteristics (mean value, variance, . . . )

POSE corresponds to the information about the current position of car 10 and the motion direction and the velocity at which the car is moving, and CRC corresponds to an error correction code.

The following structure example of measurement values comprises 10 samples of measured received power values where different distribution types are tested to approximate the set of measurement samples. Four distribution types are listed with their distribution characteristics where mu corresponds to the mean value or expectation value, sigma corresponds to the variance and lambda corresponds to a specific mean and variance value, k corresponds to shape and theta corresponds to scale parameter.

The mapping of the data samples may be done as mentioned in the following example. Here 10 samples are given and a computer is calculating the most suitable distribution, e.g., Gaussian distribution with a mean value and a variance. Therefore, it is one proposal reduce the amount of data to two values (mean value and variance), which are going to be shared via the radio channel. Furthermore, is it possible to do the mapping with a so called Mixture distribution (see https://en.wikipedia.org/wiki/Mixture_distribution).

Here follows the structure example:

Example: Mapping D_samples to the Type of Distribution

```
{
    N_sample: 10;
    D_sample:{
        Sample1-Sample10}
    Distribution:{
        {type:'gaussian', mu:, sigma: },
        {type:'poisson', lambda: },
        {type:'gamma', k:, theta: },
        {type:' exponential', lambda: },
        ...
    }
}
```

Figure 6:
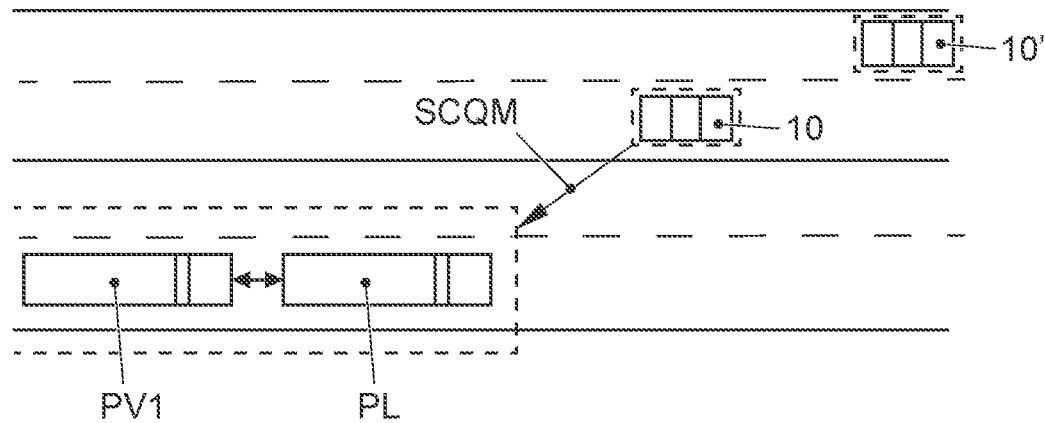
FIG. 6 illustrates the example of a use case where a transportation vehicle is informing a platoon leader transportation vehicle about its historical channel quality measurements when the transportation vehicle was driving in the opposite direction of the road where the platoon is going to perform V2V communications.

FIG. 6 shows a possible use case for this solution corresponds to a cooperative driving maneuver called "platooning". Platooning refers to the intelligent convoy driving as an application, which is also known as "high density platooning". The distances d between the transportation vehicles of the convoy, e.g., trucks are adapted to the traffic situation and controlled. The aim is to reduce the distance d between the convoy transportation vehicles as much as possible to reduce energy consumption. For this purpose, messages must be constantly exchanged between the convoy transportation vehicles. In one form of realization of a platoon, there is one transportation vehicle which is coordinating the cooperative driving maneuver. It is the transportation vehicle at the front of the platoon, which is called the platoon leader PL. The transportation vehicles in the platoon drive with equal distance and it is therefore easy to predict at what time a succeeding platoon transportation vehicle PV1 will reach the position of the leading transportation vehicle PL. FIG. 6 shows the motorway with two lanes in each direction. Only two transportation vehicles PL and PV1 of the platoon are depicted. Typically there are further transportation vehicles PV2 to PVn behind the transportation vehicle PV1. The platoon is moving on the bottom side of the motorway from left to right. On the top side of the motorway there are other transportation vehicles 10 and 10' driving in the opposite direction. The transportation vehicles 10, 10' are communicating with V2V communication based on WLAN p or LTE-V mode 4, etc. Transportation vehicle 10 is measuring the received power during the time it is moving and communicating with transportation vehicle 10'. Each time a measurement session is finished, in transportation vehicle 10 the statistical analysis of the measurement sample set is done. This may be performed in computing unit 40 or in another processing unit, e.g., in a processing unit of the on-board communication module 160. Once the type of the distribution and its characteristics has been found the message SCQM will be formatted as indicated above and broadcasted to the surrounding transportation vehicles if existing. FIG. 6 shows one instant the message SCQM is transmitted to the platoon leader PL driving on the other side of the motorway. Once the platoon leader PL has received the message SCQM it will evaluate the data and predict the channel quality for its own V2V communications to the other platoon transportation vehicles PV1 to PVn based on the historical channel quality measurements from transportation vehicle 10.

It is to be understood that the proposed method and apparatus may be implemented in various forms of hardware, software, firmware, special purpose processors, or a combination thereof. Special purpose processors may include Application Specific Integrated Circuits (ASICs), Reduced Instruction Set Computers (RISCs) and/or Field Programmable Gate Arrays (FPGAs). Optionally, the proposed method and apparatus is implemented as a combination of hardware and software. Moreover, the software may be implemented as an application program tangibly embodied on a program storage device. The application program may be uploaded to and executed by a machine comprising any suitable architecture. Optionally, the machine is implemented on a computer platform having hardware such as one or more Central Processing Units (CPU), a Random Access Memory (RAM), and Input/Output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It should be understood that the elements shown in the figures may be implemented in various forms of hardware, software or combinations thereof. Optionally, these elements are implemented in a combination of hardware and software on one or more appropriately programmed general-purpose devices, which may include a processor, memory and input/output interfaces. Herein, the phrase "coupled" is defined to mean directly connected to or indirectly connected with through one or more intermediate components. Such intermediate components may include both hardware and software based components.

It is to be further understood that, because some of the constituent system components and method operations depicted in the accompanying figures may be implemented in software, the actual connections between the system components (or the process operations) may differ depending upon the manner in which the proposed method and apparatus is programmed. Given the teachings herein, one of ordinary skill in the related art will be able to contemplate these and similar implementations or configurations of the proposed method and apparatus.

REFERENCE SIGN LIST

10 $1^{st}$ Transportation Vehicle
10' $2^{nd}$ Transportation Vehicle
20 Touch Screen
30 Gateway
40 Computing Device
50 Operation Element Unit
60 Memory Unit
70 Data Line to Display Unit
80 Data Line to Memory Unit
90 Data Line to Operation Element Unit 100 1$^{st}$ Data Bus
102 2$^{nd}$ Data Bus
104 3$^{rd}$ Data Bus
106 4$^{th}$ Data Bus
110 Multifunction Display
120 Telephone
130 Navigation System
140 Radio
150 Camera
160 On-Board Communication Unit
172 Engine Control Unit
174 ESC Control Unit
176 Transmission Control Unit
182 Adaptive Cruise Control Unit
184 Automatic Driving Control Unit
186 LIDAR Sensor
190 On-Board Diagnosis Interface
300 Internet
310 Road Side Unit
320 Backend Server
PL Platoon Leader Transportation Vehicle
PV1 Platoon Transportation Vehicle 1
L Distance From Center Of The Road
SCQM Shared Channel Quality Message
S trajectory
S1 1$^{st}$ Position
S2 2$^{nd}$ Position
ΔS trajectory section

The invention claimed is:

1. A mobile station configured for use in a method for transmitting, to a first mobile station, at least one information entry about a measured channel quality, the information entry being transmitted from a second mobile station, the measured channel quantity having been measured by the second mobile station,
   wherein the mobile station includes a wireless communication module for transmitting messages to a third mobile station,
   wherein the wireless communication module transmits a channel quality report to the first mobile station in a shared channel quality message, the channel quality report comprising the at least one information entry about the channel quality measured by the second mobile station at a position indicated in the channel quality report, and
   wherein the at least one information entry comprises a description of a statistical distribution of channel quality measurement values taken at different places of the second mobile station while the second mobile station is moving along a section of a travelling path, wherein the at least one information entry about a position of the section of the travelling path the second mobile station is moving on while taking measurement values for the channel quality comprises a position information in a curvilinear coordinate system the first, second and third mobile stations are moving in.

2. The mobile station of claim 1, wherein the wireless communication module receives a shared channel quality message from a second mobile station, and wherein the mobile station further comprises a processing unit that is configured to predict a channel quality for the communication between the first mobile station and a partner station based on the channel quality report received in the shared channel quality message.

3. The mobile station of claim 2, wherein the wireless communication module transmits a message to the partner station with a transmission characteristics setting corresponding to the channel quality measurement for the communication between the first mobile station and the partner station.

4. The mobile station of claim 1, wherein the wireless communication module communicates messages according to the WLAN p communication system corresponding to the IEEE 802.11p standard or the LTE-V mode 4 communication system.

5. A transportation vehicle comprising the apparatus of claim 1.

6. The mobile station of claim 1, wherein the description of a distribution comprises the distribution category and one or more characteristics of the distribution.

7. The mobile station of claim 6, wherein the one or more characteristics comprise the mean value and variance of the distribution.

8. The mobile station of claim 1, wherein the channel quality report further comprises at least one information entry about the movement of the second mobile station.

9. The mobile station of claim 8, wherein the at least one information entry about the movement of the second mobile station includes movement direction and/or speed of the movement.

10. A method for transmitting, to a first mobile station, an information entry about a measured channel quality, the information entry being transmitted from a second mobile station, the measured channel quantity having been measured by the second mobile station, the method comprising:
   sending, to the first mobile station from the second mobile station, a report about the channel quality measured at the second mobile station,
   wherein the report comprises at least one information entry about the channel quality measured by the second mobile station at a position indicated in the channel quality report, and
   wherein the at least one information entry comprises a description of a statistical distribution of channel quality measurement values taken at different places of the second mobile station while the second mobile station is moving along a section of a travelling path, and
   wherein the at least one information entry about a position of the section of the travelling path the second mobile station is moving on while taking measurement values for the channel quality comprises a position information in a curvilinear coordinate system the first and second mobile stations are moving in together with a third mobile station.

11. The method of claim 10, wherein the description of a distribution comprises the distribution category and one or more characteristics of the distribution.

12. The method of claim 11, wherein the one or more characteristics comprise the mean value and variance of the distribution.

13. The method of claim 12, wherein the report further comprises at least one information entry about the time the second mobile station is moving on the section of the path while taking measurement values for the channel quality.

14. The method of claim 12, wherein the channel quality report further comprises at least one information entry about the movement of the second mobile station.

15. The method of claim 14, wherein the at least one information entry about the movement of the second mobile station includes movement direction and/or speed of the movement.

16. The method of claim 10, wherein the position information indicated in the report comprises at least one information entry for the position of the section of the travelling path the second mobile station is moving on while taking measurement values for the channel quality.

17. The method of claim 10, wherein the report is sent to the first mobile station in a shared channel quality message.

18. The method of claim 10, wherein a shared channel quality message is received from a second mobile station, and a channel quality is predicted for the communication between the first mobile station and a partner station based on the channel quality report received in the shared channel quality message.

19. The method of claim 18, wherein a message is transmitted to the partner station with a transmission characteristics setting corresponding to the channel quality measurement for the communication between the first mobile station and the partner station.

20. The method of claim 10, wherein messages are communicated according to the WLAN p communication system corresponding to the IEEE 802.11p standard or the LTE-V mode 4 communication system.

* * * * *